INVENTOR.
N. A. KIMMEL

BY Hudson and Young

ATTORNEYS

June 13, 1961 N. A. KIMMEL 2,987,880
INSULATION FOR ROCKET MOTORS
Filed March 17, 1958 3 Sheets-Sheet 3

INVENTOR.
N.A. KIMMEL
BY Hudson and Young
ATTORNEYS

United States Patent Office 2,987,880
Patented June 13, 1961

2,987,880
INSULATION FOR ROCKET MOTORS
Norman A. Kimmel, Waco, Tex., assignor to Phillips Petroleum Company, a corporation of Delaware
Filed Mar. 17, 1958, Ser. No. 721,728
5 Claims. (Cl. 60—35.6)

This invention relates to a method and means for insulating a rocket motor for extended periods of operation. In one aspect of the invention, insulation is provided for a rocket motor so as to maintain the rocket motor surface at a predetermined maximum temperature.

Certain rocket motor applications require motors that are designed with a minimum weight possible and that operate for extended periods of time. In these applications, whether the motor be constructed of reinforced plastic or heat treated alloys of metal it becomes necessary to insulate the case and/or other component parts from the inside temperature so that a maximum allowable case temperature will not be reached that will either cause the case to lose strength and fail prematurely during firing, or that will cause malfunction of some other component part of the system in which the motor is utilized. One example of such application is a target rocket plane which is remotely controlled and therefore requires instruments and electrical circuits which must be protected from excessive heat. Such a device will ordinarily operate, or at least be capable of operating, for periods of time such that the temperature conditions of the rocket motor will attain equilibrium and under such conditions of equilibrium the maximum temperature of the case must not exceed a predetermined maximum temperature.

It is therefore an object of this invention to provide a method and means for insulating a rocket motor case so that the case surface will not exceed a predetermined allowable maximum temperature. It is also an object of this invention to provide a light weight laminate which will confine the heat released from the combustion of a propellant grain within the rocket motor within prescribed limits. It is a further object of this invention to provide a method for building up an insulating laminate within the rocket motor case. Other objects and advantages of this invention will be apparent to one skilled in this art upon study of the disclosure of the invention including the attached drawing wherein, FIGURE 1 is a partial sectional view of a rocket engine showing the insulating laminate in exaggerated scale;

For extended, uninterrupted periods of operation solid fuel rocket motors provide economy, simplicity, and dependability. The propellant is usually a dual-thrust grain composed of a booster charge and a sustainer charge as a cylindrical end-burning grain which is restricted on the sides and at the forward end. In such applications an extended blast tube is usually a requirement in order to conduct the exhaust gases through the tail assembly of the vehicle. Another requirement is low external case temperature to protest the electrical wiring and instrumentation surrounding the engine.

Broadly peaking, the invention contemplates a laminate made up of the following components: a sandwich of aluminum foil between two layers of ceramic fiber paper adjacent the motor case; and then a layer of phenolic resin impregnated asbestos. Preferably another layer of aluminum foil is also employed next to the asbestos layer. The second layer of aluminum foil is attached to the propellant grain and aids in positioning the grain in the motor case in addition to its insulating properties. The restrictor of the propellant grain adds to the total insulation. The aft engine head and blast tube are lined with a reinforced resin premolded liner.

Figure 1:
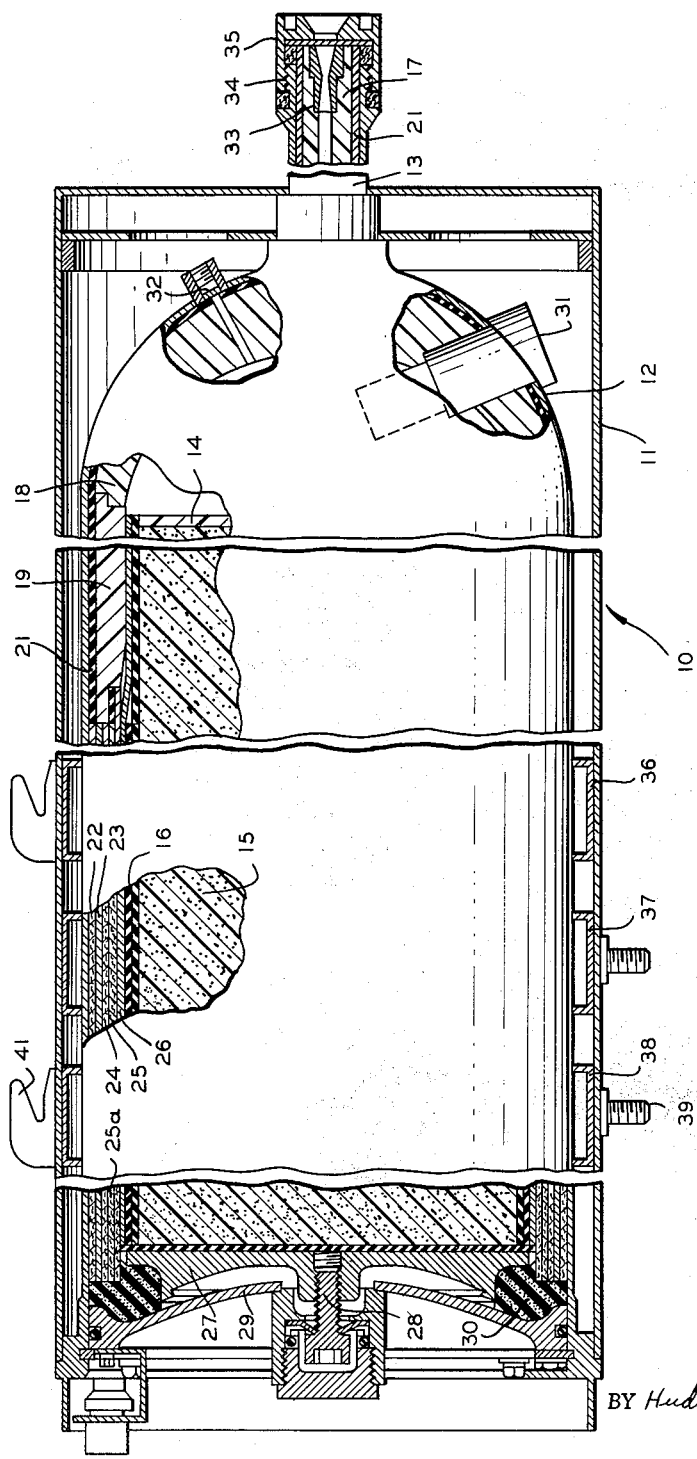

A better understanding of the invention may be obtained by referring to the drawing and particularly to FIGURE 1 which shows the rocket engine 10 partially in section and encased in fairing 11. Motor case 12 and blast tube 13 are constructed of heat-treated (SAE 4130) steel. The motor case contains the dual propellant grain made up of boost phase 14 and the sustaining phase 15. The grain is restricted on the sides and forward end by restrictor 16. The blast tube and aft head are insulated by reinforced resin premolded liners indicated at 17, 18 and 19. The liners are cemented in place by an epoxy resin cement shown at 21. The motor case forward from the aft head straight liner 19 is insulated by a laminated structure comprising two layers of ceramic fiber paper 22 and 24 with a layer of aluminum foil 23 between and then a layer of phenolic resin impregnated asbestos 25. The asbestos layer is cemented to the fiber paper with epoxy cement. A layer of aluminum foil 26, in the form of pressure sensitive aluminum tape, is applied to the restricted propellant grain before the grain is placed in the motor and forms a part of the insulation laminate. The insulation assembly is reinforced by additional bands of resin impregnated asbestos 25a at each end and at about the center of the laminated insulation structure. The thickness of the insulation is exaggerated in scale in the drawing for purpose of illustration.

The propellant grain is secured in position in the rocket motor by forward end plate 27 which is bonded to the restricted charge and is secured to forward head 29 by cap screw 28. Sponge rubber ring 30 dampens shock.

Igniter 31 and safety pressure diaphragm 32 can be installed after the ceramic reinforced aft head liner is installed. Steel nozzle 33 and copper starting disc 34 are secured in position by blast tube cap 35 which is threaded onto the blast tube.

Reinforcing rings 36, 37 and 38 distribute the load upon the wing studs 39 and launching hooks 41.

Figure 2:
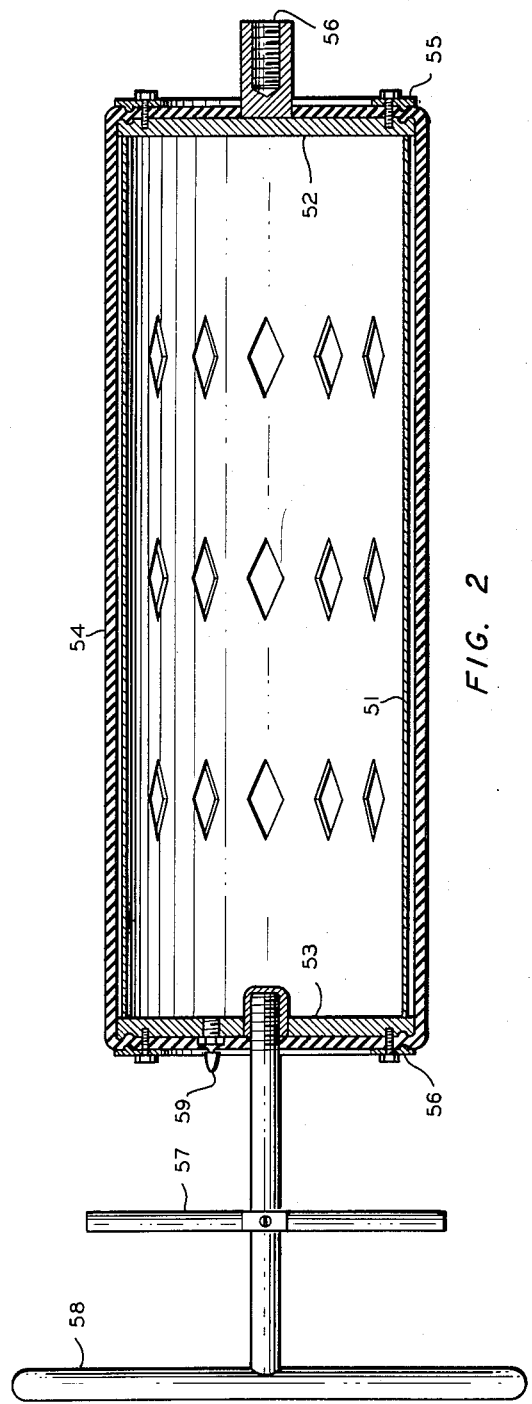
FIGURE 2 is a sectional view of an expandable mandrel used in positioning the layers of laminate in the rocket motor case.

FIGURE 2 is a sectional view of an inflatable mandrel used to position the resin impregnated asbestos liner in the insulation assembly in the motor case. A perforated metal cylinder 51 is secured to imperforate heads 52 and 53, supports a rubber bag 54 which covers the preforated cylinder and is secured to the imperforate heads 52 and 53 by rings 55 and 56. A guide handle (not shown) is threaded into the guide cap so as to project through the blast nozzle opening during insertion of the mandrel in the rocket motor case. An adjustable stop 57 is mounted on loading handle 58 so as to engage the forward end of the case to position the mandrel in the rocket motor. The mandrel is inflated with air or other fluid through valve 59.

Figure 3:
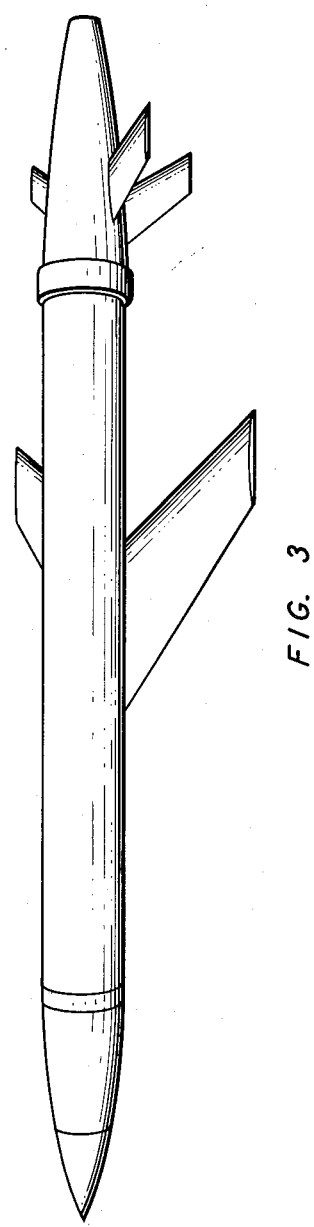
FIGURE 3 is an illustration of the rocket engine of this invention mounted in a remote controlled target plane.

FIGURE 3 shows the rocket motor with fuselage and wings attached for use as a remote controlled target plane.

The preferred method for installing the insulation in a 10 inch diameter rocket motor will be described. The reinforced resin liner for the blast tube and aft head is preformed. The blast tube liner is press-fitted and is 0.625 inch thick. The hemispherical aft head is lined with a preformed reinforced resin liner 0.625 inch thick and a cylindrical section 0.375 inch thick. The aft head liner is installed by applying epoxy resin cement to the inside of the aft head, installing the liner and applying pressure to urge the liner into sealing contact with the aft head until the resin cement cures.

The first section of the laminate which comprises the case insulation is made up of a sheet of 0.002 inch aluminum foil sandwiched between two sheets of 0.08 inch mineral fiber paper. The sheets are precut so that the paper sections form a butted joint and the aluminum foil forms a 0.5 inch lap joint when the materials are formed into a liner tube. The inner tube is formed first with the joints butted and the ends flush and the tube is taped in position with pressure sensitive paper tape. The aluminum sheet is wrapped around the inner tube and taped in position. The outer tube is wrapped around the foil and taped in position.

The assembled tube is positioned in the motor case with the aft end butted against the aft head liner. The forward end is flush with the position of the forward end of the propellant grain.

The next section of the laminate is a sheet of about 0.04 inch thick of resin impregnated asbestos formed into a split tube by wrapping the sheet around a deflated expandable mandrel and taping it in position with a few pieces of pressure sensitive paper tape. A thin coat of epoxy resin cement is applied to the exterior surface of the tube and the mandrel is positioned within the motor case and inflated so as to break the tape seals and place the tube in contact with the first section of the laminate with the edges of the split tube butted.

A previously cured, and cooled, restricted propellant grain is then wrapped with a layer of pressure sensitive aluminum tape and loaded into the motor case. The tape adds strength to the restrictor, facilitates loading the grain into the motor and also serves as a part of the insulation system.

In a 10 inch diameter rocket motor the insulation thicknesses are as follows: the blast tube liner, 0.625 inch; the aft head, 0.625 inch; the straight section of reinforced resin, 0.375 inch; and the laminated structure forward from the straight liner section about 0.25 inch.

A double thickness of restrictor is applied to the side of the grain forward from the reinforced resin straight section. The forward head and blast tube are placed in position after the propellant grain is positioned in the motor case and the igniter usually is inserted just prior to use.

The aft head liner and the blast tube liner can be fabricated from reinforced resins such as phenol-formaldehyde resins reinforced with glass cloth, chopped fiber glass or asbestor fibers. Such materials are available on the market under well known names, such as "Haveg," "Formica," and the like.

The ceramic fiber paper is made from air blown minerals such as aluminum silicate and the fibers which are from ½ to 3 inches long are made into paper sheets.

The resin impregnated asbestos is a felt-like material containing asbestos fibers and about 38 to 42 percent of a phenolic resin binder.

The preferred solid propellants for use in a sustained operation engine are a composite type containing approximately 80 weight percent ammonium nitrate as the oxidizer, 10 weight percent synthetic rubber as the fuel-binder, and 10 weight percent of other ingredients such as burning rate catalyst, plasticizers, carbon blacks, and curatives. The sustainer phase of the grain and the booster phase are similar in composition with the higher burning rate of the booster phase being obtained by the modification of the catalyst system and by using slightly different processing techniques.

A preferred restricting material is a GRS rubber, compounded with carbon black, plasticizers and curing agents. After compounding, the material is rolled into sheets approximately 0.15 inch thick on a roll mill. The restrictor bonds to both the grain and the metal end plate upon curing. The end plate thus becomes a part of the grain assembly and is positioned in the rocket motor by the cap screw in the forward motor case head.

The following specific embodiments of the invention are exemplary and are not to be construed as limiting the invention.

*Example I*

Rocket engines, 10 inches in diameter and 59 inches long with a 29 inch blast tube, having an inner diameter of 0.75 inch, and insulated as hereinbefore described, have been static fired for 8 minute duration periods and have been operated in flight tests with maximum case temperature sufficiently low to protect the electrical wiring and instrumentation of the device. The maximum case temperature was in the vicinity of the aft head and reached 700–800° F. at the end of the static firing period. The remainder of the case remained under 375° F.

*Example II*

Figure 4:
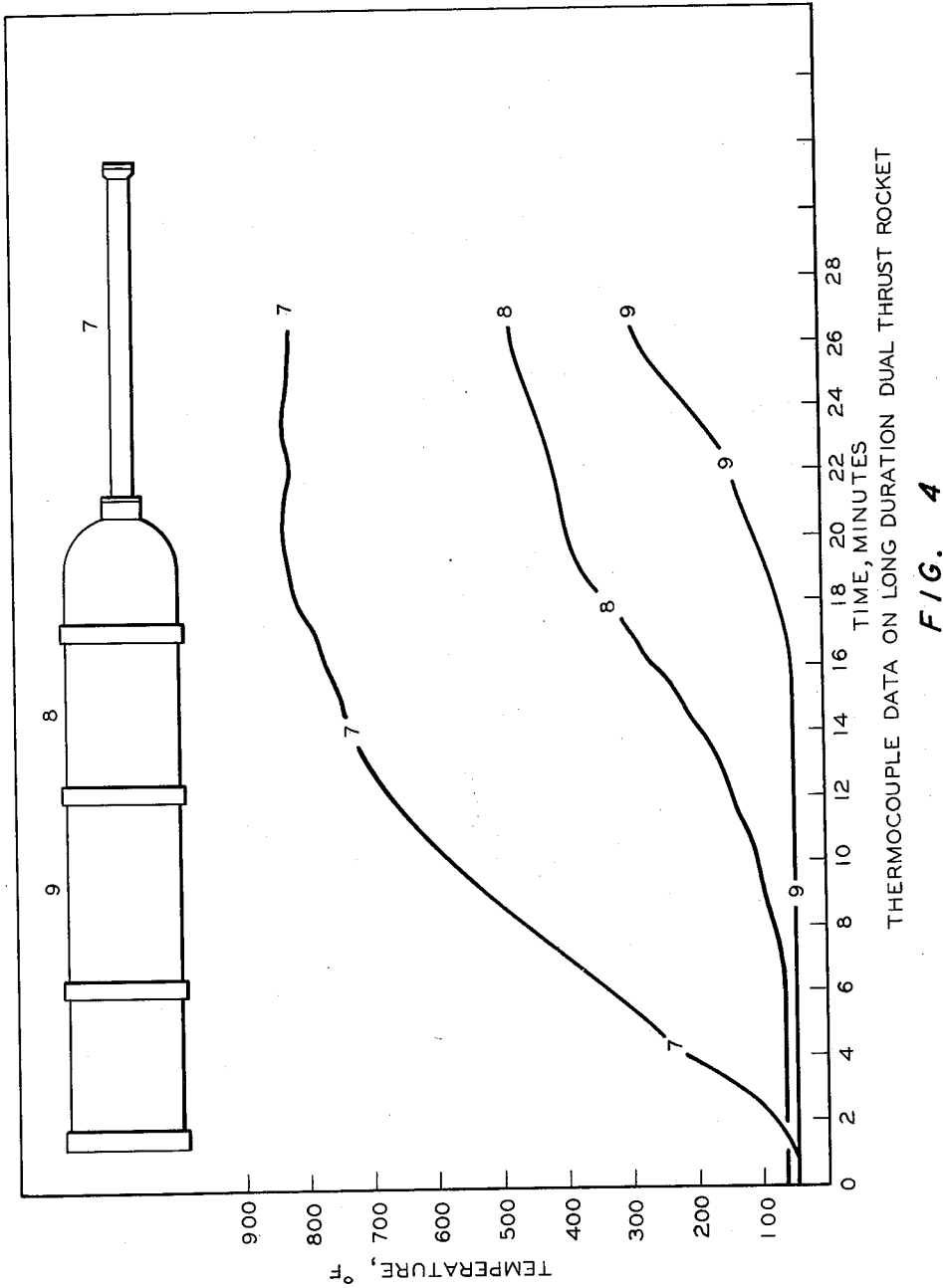
FIGURE 4 is a graphic illustration of rocket motor case temperatures during firing.

The burning rate of the solid propellant can be controlled, within certain limits, by control of operating pressure because the burning rate increases as pressure increases. The flame temperature of the solid propellant is substantially independent of pressure. A rocket motor as described in Example I was equipped with a large exhaust nozzle so as to extend the duration of the firing period of approximately 26 minutes. The insulation was as previously described and no fairing was used around the engine. Thermocouples were positioned to sense surface temperatures. The thermocouples were welded on the top of the case and blast tube. One was located midway fore and aft on the blast tube, another was located one inch forward of the aft case support ring, the third was installed two inches forward of the center case support ring. The highest case temperature occurs adjacent the aft head where the reinforced plastic liner is ⅜ inch thick. Therefore, during the firing test this section of the case was water cooled to offset the insufficient thickness of insulation. The firing was made and fired for approximately 26 minutes. The blast tube skin surface temperature stabilized after 20 minutes duration at 825° F. and remained at that temperature for the remainder of the firing. The highest temperature recorded on the skin surface of the case over the laminate insulation was 475° F. The results of this firing test are shown graphically in Figure 4 of the drawing.

If the straight section liner had been 0.625 inch thick, that portion of the case would attain a temperature no higher than the hemispheric section which was 0.625 inch thick.

The results of the above runs demonstrate that an insulation has been provided whereby the skin temperature of a rocket motor can be controlled for long duration firing periods.

All known solid propellants can be utilized in the rocket motor of this invention.

Variations and modifications are possible within the scope of this disclosure without departing from the spirit and scope of the invention.

That which is claimed is:

1. An insulating laminate for a rocket motor case comprising a first layer of ceramic fiber paper adjacent the inner rocket motor case; a first layer of aluminum foil adjacent said first fiber paper; a second layer of ceramic paper adjacent said first aluminum foil; a layer of resin impregnated asbestos fiber adjacent said second layer of ceramic fiber paper.

2. An insulating laminate for a rocket motor case comprising a first layer of ceramic fiber paper adjacent the inner rocket case wall; a first layer of aluminum foil adjacent said first fiber paper; a second layer of ceramic fiber paper adjacent said first aluminum foil; a layer of resin impregnated asbestos fiber adjacent said second layer of ceramic fiber paper; and a second layer of aluminum foil adjacent said resin impregnated asbestos fiber.

3. For use in a rocket motor comprising a motor case, a forward head, an aft head, a blast tube and a solid propellant grain, insulation means comprising a reinforced resin liner secured to the inner wall of the blast tube and aft head; a laminate adjacent the inner wall of the motor case from the aft head liner to the forward head and comprising, in serial relationship, a first layer of ceramic fiber paper, a first layer of aluminum foil, a second layer of ceramic fiber paper, a layer of resin impregnated asbestos, a second layer of aluminum foil and two adjacent layers of restrictor material bonded to said second layer of aluminum foil and to said solid propellant grain.

4. In a rocket motor, the combination comprising a combustion chamber; an insulating laminate comprising a first layer of ceramic fiber paper adjacent the combustion chamber wall; a first layer of aluminum foil adjacent said first fiber paper; a second layer of ceramic fiber paper adjacent said first aluminum foil; a layer of resin impregnated asbestos fiber adjacent said second layer of ceramic fiber paper; and a second layer of aluminum foil adjacent said resin impregnated asbestos fiber.

5. In a rocket motor, the combination comprising a combustion chamber; a blast tube; a peripherally restricted, end-burning solid propellant grain; and an insulating laminate comprising a first layer of ceramic fiber paper adjacent the combustion chamber wall, a first layer of aluminum foil adjacent said first fiber paper, a second layer of ceramic fiber paper adjacent said first aluminum foil, a layer of resin impregnated asbestos fiber adjacent said second fiber paper, and a second layer of aluminum foil adjacent said resin impregnated asbestos fiber and bonded to the restriction of said propellant grain.

References Cited in the file of this patent

UNITED STATES PATENTS

| | | |
|---|---|---|
| 2,479,470 | Carr | Aug. 16, 1946 |
| 2,563,265 | Parsons | Aug. 7, 1951 |
| 2,703,299 | Seymour et al. | Mar. 1, 1955 |
| 2,724,672 | Rubin | Nov. 22, 1955 |
| 2,816,418 | Loedding | Dec. 17, 1957 |
| 2,835,107 | Ward | May 20, 1958 |